(12) United States Patent
Rudwick, III

(10) Patent No.: US 8,756,193 B2
(45) Date of Patent: Jun. 17, 2014

(54) SYSTEM AND METHOD FOR PERSISTING OBJECT POINTERS

(75) Inventor: Thomas W. Rudwick, III, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/285,683

(22) Filed: Oct. 31, 2011

(65) Prior Publication Data

US 2013/0110882 A1    May 2, 2013

(51) Int. Cl.
*G06F 7/00*    (2006.01)

(52) U.S. Cl.
USPC .................................................. 707/626

(58) Field of Classification Search
USPC .................................................. 707/626
See application file for complete search history.

(56) References Cited

U.S. PATENT DOCUMENTS

| | | |
|---|---|---|
| 5,794,256 A | 8/1998 | Bennett et al. |
| 5,887,275 A | 3/1999 | Nguyen et al. |
| 6,128,771 A | 10/2000 | Tock et al. |
| 6,915,510 B1 * | 7/2005 | Tock et al. ................... 717/165 |
| 7,739,290 B2 | 6/2010 | Rossmann |
| 2003/0101173 A1 * | 5/2003 | Lanzatella et al. ............... 707/4 |
| 2003/0182292 A1 * | 9/2003 | Leong et al. ................... 707/100 |

* cited by examiner

*Primary Examiner* — Truong Vo
(74) *Attorney, Agent, or Firm* — Rory D. Rankin; Meyertons, Hood, Kivlin, Kowert & Goetzel, P.C.

(57) ABSTRACT

A system and method for persisting object pointers in a computing system. Subsequent to initiating an operation to store a plurality of memory resident objects from a memory to persistent storage, a first object of the objects is accessed. Each of the objects may include pointers to other objects in memory. An object identifier is created for the object and stored within the first object. References within the first object to other objects are replaced with object identifiers created for the referenced objects. When an object identifier is created and stored within an object, existing data within the object is replaced by the identifier. The replaced data is stored in a data structure along with a pointer to the object in memory. Subsequent to storing the objects to persistent storage, the data structure is used to restore the replaced data to the objects in memory.

19 Claims, 9 Drawing Sheets

SYSTEM AND METHOD FOR PERSISTING OBJECT POINTERS

BACKGROUND OF THE INVENTION

1. Field of the Invention

This invention relates to computer systems, and more particularly, to managing objects in a computing system.

2. Description of the Relevant Art

Computing systems are widely used to managing and manipulating large amounts of data. In such systems data may be represented in a variety of ways. Often times various collections of data may be identifiable as distinct units or types of data. For example, in large database systems data items may be represented as records of various types. In other systems, data may be represented as objects or various types. Irrespective of the particular way data items are represented, data items typically have particular relationships to other data items in the system. For example, in object oriented systems, objects often include references to other objects within the system. When such objects are resident in memory, these references to other objects often takes the form of references or pointers which identify locations in memory where a referenced object resides. As memory used for storing such objects may be dynamically allocated, the references themselves may be dynamically generated and typically only persist as long as the object remains in memory. Consequently, if the objects in memory are to be stored to persistent storage (e.g., a storage array) and later restored to memory, the references will no longer be valid. This is due to the fact that as the objects are restored to memory from persistent storage, memory is again dynamically generated for their storage and the references which are also dynamically generated will differ from the original references.

In view of the above, methods must be used to maintain an identification of the proper relationships between objects when the objects are stored to persistent storage and restored to memory.

SUMMARY OF THE INVENTION

Systems and methods for managing objects in a computing system are contemplated.

A method is contemplated in which objects in a memory are written to persistent storage. The objects in the memory may comprise a hierarchy of objects, each of which may include one or more references to the other objects. Subsequent to initiating an operation to store a plurality of objects from a memory to persistent storage, a first object is accessed. If an object identifier has already been assigned to the accessed object, the object identifier assigned to the object is written to persistent storage. If an object identifier has not been assigned to the object, the method includes assigning a new object identifier to the object; writing the new object identifier to the persistent storage; storing the new object identifier in the object; and processing each data member of the object.

Also contemplated are embodiments wherein when an object identifier is stored within an object, the identifier replaces existing data within the object. The data replaced is then stored in a temporary data structure at a location that corresponds to the object identifier. In various embodiments, the data structure may be an array and the object identifier may represent an index of the array. In addition to the above, the location in the array may store a pointer to the object in memory.

Also contemplated are embodiments wherein processing data members of an object includes writing non-reference data members to the persistent storage, and replacing references within the object to other objects with object identifiers created for the other objects. Further, the method may include writing the type of a given object to persistent storage.

In addition to the above, embodiments are contemplated in which objects stored to persistent storage may be restored. Restoration of objects may include creating a new temporary data structure and retrieving an object identifier from the persistent storage. If the object identifier has already been assigned to a restored object, then the method includes retrieving a pointer to the object from the new temporary data structure. On the other hand, if the object identifier has not already been assigned to a restored object, then the method may include reading an object type from the persistent storage, creating a new object that corresponds to the object type, saving a pointer to the new object in a location of the new temporary data structure that corresponds to the object identifier, and processing each data member of the new object.

These and other embodiments are described herein and will be more fully appreciated upon reference to the following description and drawings.

Figure 1:
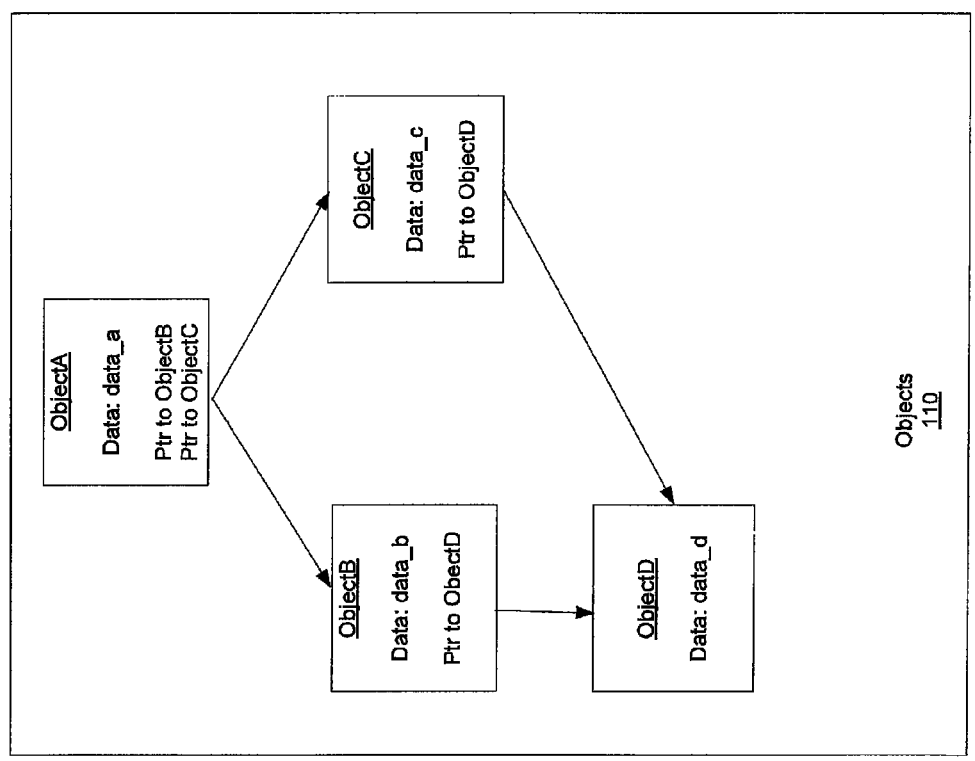
FIG. 1 illustrates one embodiment of data objects and a portion of their representation in memory.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

FIG. 1 illustrates a logical representation 110 between a number of objects in a computing system, and how those objects may be stored (at least in part) in a memory 190. For purposes of discussion, objects will be used to represent and describe various data items. However, the actual representation of such data items may vary from that discussed. Those skilled in the art will appreciate that the systems and methods described herein may be applied to various types of data items. In the example shown, the logical represent of the objects 110 includes an ObjectA, ObjectB, ObjectC, and ObjectD. ObjectA is shown to include a pointer (reference) to each of ObjectB and ObjectC. Both of ObjectB and ObjectC include a pointer to ObjectD.

Memory 190 in FIG. 1 then illustrates where and how such objects 110 may be stored. For ease of illustration, memory 190 is shown with an Address which identifies the address of a corresponding memory location(s), and data members of the object which may be stored at that location. As may be appreciated, data not shown that corresponds to a given object may also typically be stored as part of the object. For example, ObjectA 120 is shown to be stored at a location beginning at memory address 0x00000000, ObjectD 130 at location 0x00001020, ObjectC 140 at location 0x00008200, and ObjectB 150 at location 0x00010010.

As shown in the logical representation of the objects 110, ObjectA includes pointers to ObjectB and ObjectC. Therefore, in the memory 190, ObjectA 120 is shown to include a pointer to the memory location occupied by ObjectB 150 (0x00010010) and ObjectC 140 (0x00008200). ObjectB 150 is shown to include a memory reference to ObjectD 130 at location 0x00001020. ObjectC 140 is also shown to include a reference to ObjectD 130 at location 0x0001020. In the embodiment shown, data stored in the memory 190 may be aligned to particular addressing boundaries. For example, the stored pointers may be aligned to sixteen byte boundaries as shown. Other embodiments may align to different boundaries. In addition, different data types (e.g., integer, Boolean, or otherwise) may be aligned to different addressing boundaries (e.g., eight or sixteen byte boundaries). Numerous such embodiments are possible and are contemplated.

Generally speaking, each of the objects illustrated in FIG. 1 will include other data members besides references to other objects. For example, each of the objects ObjectA-ObjectD include data items (data_a, data_b, data_c, data_d). These data items, or data members, are shown stored in the memory 190 as well. It is noted that in some embodiments, these data members themselves may be pointers or references to memory location. In this case, the data is stored on a sixteen byte boundary—though this may be otherwise in different embodiments.

As discussed above, it may be desirable to store memory resident objects to persistent storage. For example, the objects may form part of a database and a backup of the database and its objects may be desired. Alternatively, storage of objects which are not currently in use to persistent storage may be desired (e.g., where the database is in use, but it is not desirable or possible to maintain all objects in memory at one time). Accordingly, the objects shown in memory 190 may be stored to persistent storage as described in the following discussion. It is noted that while the methods and mechanisms described herein discuss storing objects to persistent storage, the methods and mechanisms herein may also be used for transmitting objects across a data network using various communications protocols.

Figure 2:
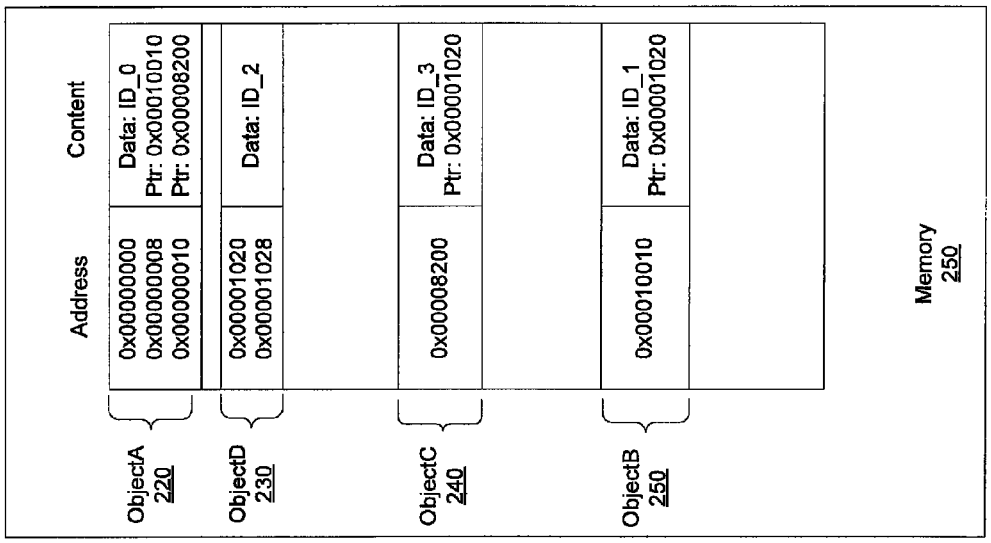
FIG. 2 illustrates one embodiment of data objects and a portion of their representation in memory.
Figure 2:
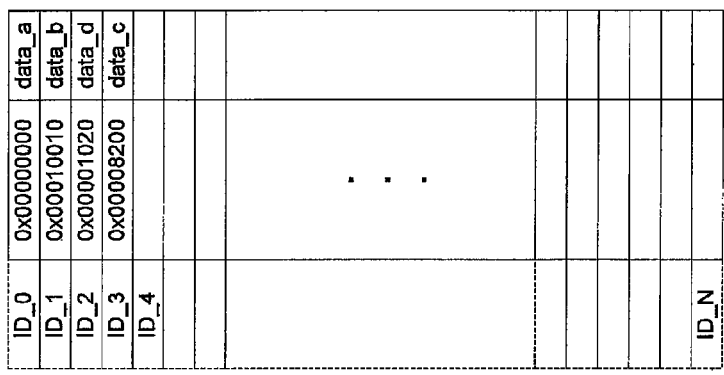
Figure 2:
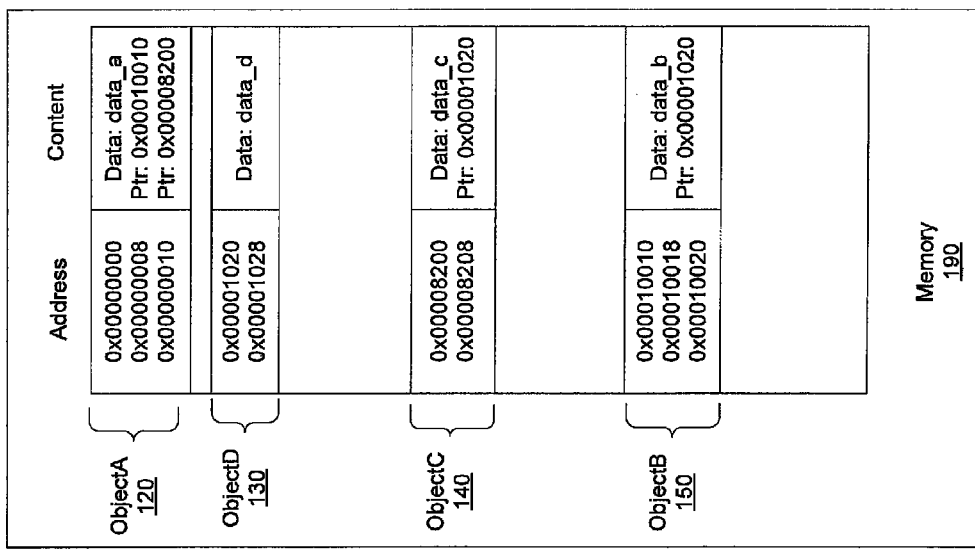

In FIG. 2, the same objects of FIG. 1 are shown in memory 190 before processing the objects and after processing of the objects (as shown by memory 250) as part of a store operation. Also shown in FIG. 2 is a data structure 210. Data structure 210 may be a table, map, array, or other type of data structure. For purposes of discussion and illustration, data structure 210 is generally described as a map or table. However, such a term is not intended to be limiting. In one embodiment, map 210 is a temporary data structure that is used while objects are stored to persistent storage. In the example shown, the objects 120-150 are to be stored from memory to persistent storage (e.g., a data storage array). As discussed above, the pointers (references) that are used to identify the objects within the memory will no longer be valid when the objects are restored from persistent storage to memory. Therefore, in the embodiment shown the objects are processed as part of an operation to store the objects. As part of the processing of the objects, map 210 is used to aid in the backup/storing of the objects. In various embodiments, memory object which are stored to persistent storage also remain in memory (i.e., they are not removed from memory as part of the store operation). In such embodiments, objects in memory which have been modified during a store operation may also be restored to their original condition in memory as part of the store operation.

In one embodiment, each object in memory 190 that is to be stored is processed by accessing the object, assigning a unique identifier to the object, and storing the unique identifier within the object itself. In addition, the memory location of the object may also be stored in the map 210 in a location corresponding to where the object's data has been stored. For example, the first entry of the map is shown to be storing the memory location of ObjectA 0x00000000 and the data member data_a from ObjectA 120. As storing new additional data within each object would result in significant storage overhead in a system including many thousands or millions of objects, in various embodiments existing data within the object is replaced by the unique identifier. In order to avoid a loss of data, the data within the object that has been replaced is temporarily stored in the map 210. In one embodiment, map 210 does not store a unique identifier that corresponds to data from objects. Rather, in various embodiments, map 210 is a data structure and the unique identifiers (ID_0, etc.) are used to identify particular locations within the data structure. For example, map 210 may be an array and the object identifiers may represent indexes to the array. In other words, ID_0 in the figure may represent the first element (e.g., element zero) of the array, ID_1 may represent element one of the array, and so on. In such an embodiment, map 210 simply stores data from the objects in a location that corresponds to the identifier assigned to the object. In alternative embodiments, map 210 may store both the data from the object and the unique identifier assigned to the object (ID_0, ID_1, etc.) in such a manner that the data may be identified as corresponding to that particular object.

In an embodiment where the data structure 210 is a structure such as an array, assigning unique identifiers to each of the objects as they are processed may simply entail assigning an array index to the object, incrementing the index, assigning the incremented index to the next object, and so on. In the example of FIG. 2, memory 250 shows the contents of the memory after processing of the objects has begun. ObjectA 220 has had its data (data a) replaced with an object identifier assigned to the object, ID_0. The replaced data, data_a, has then been stored in the map 210 in a location that corresponds to ID_0. As noted above, ID_0 may not necessarily be expressly stored in the map 210, but may simply identify a location within the map 210. ObjectD 230 has been assigned an object identifier of ID_2, ObjectC 240 and object identifier of ID_3, and ObjectB an object identifier of ID_1. Data for these latter objects has likewise been stored in map 210.

In addition to assigning unique identifiers to each of the objects, processing includes replacing each of the data members of objects which are pointers with an object identifier assigned to the referenced object. It is noted that the order in which identifiers are assigned to objects and pointers replaced in the objects may vary. For example, in one embodiment an object identifier may first be assigned to all objects. Subsequently, pointers within the objects may be replaced by object identifiers. Alternatively, an object identifier may be assigned to an object and its pointers processed for replacement prior to proceeding to a next object. In various embodiments, a recursive procedure may be used for processing objects. Numerous such alternatives are possible and are contemplated and will be discussed in further detail below. In the example shown, object identifiers have been assigned to each of objects 220-250. Having assigned these identifiers, stored them within the objects, and stored the replaced data in the map 210, replacement of the pointers may be performed.

Figure 3:
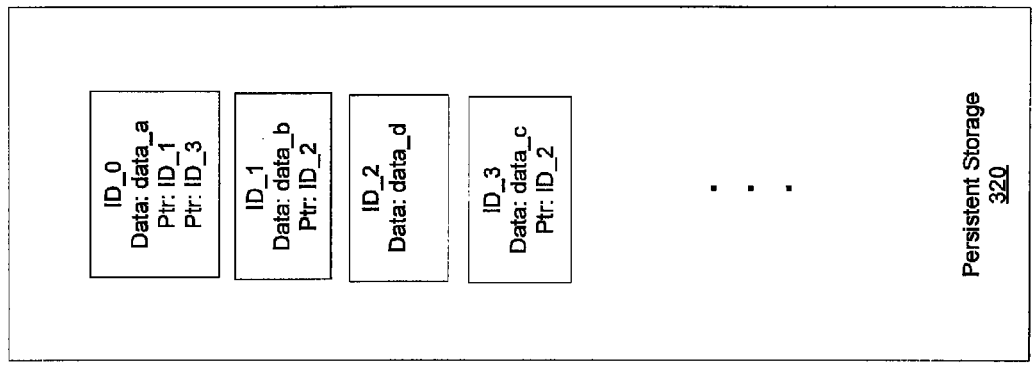
FIG. 3 illustrates one embodiment of a system for processing objects in memory.
Figure 3:
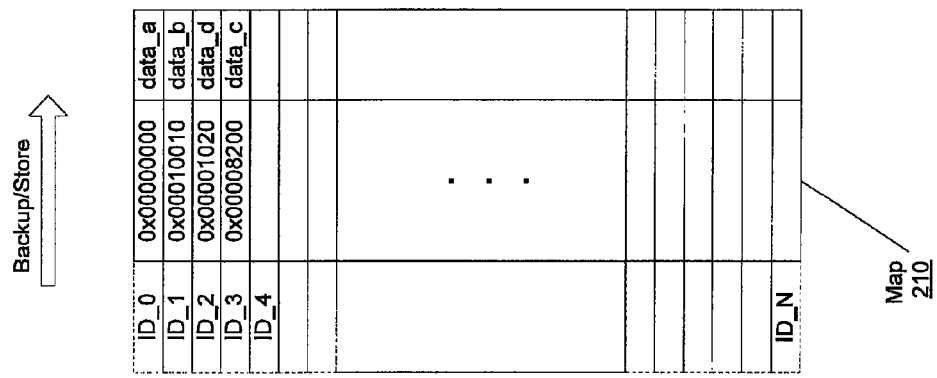
Figure 3:
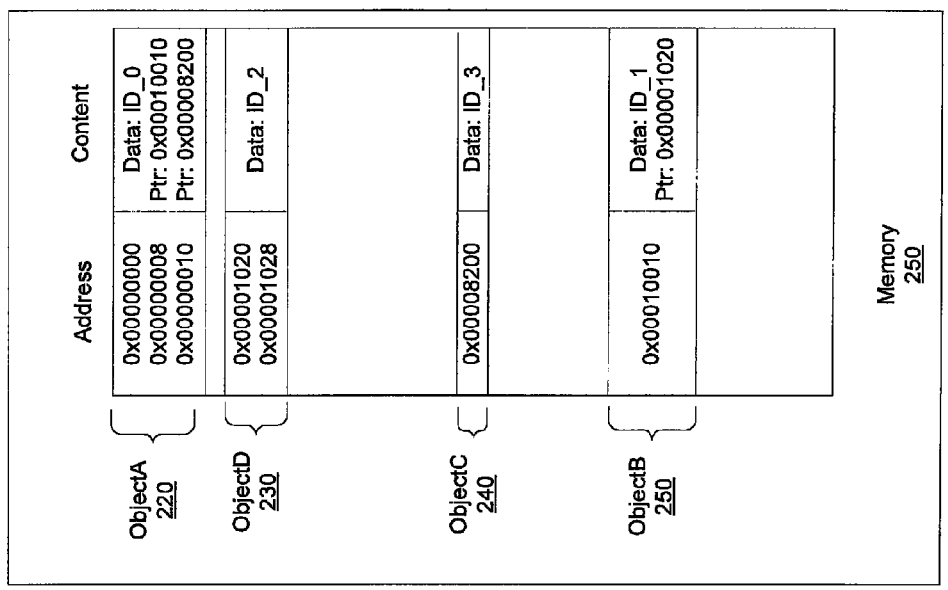

FIG. 3 generally illustrates the storing or backup of objects from memory to persistent storage 320. FIG. 3 illustrates the memory 250 and map 210 included in FIG. 2, and persistent storage 320. Persistent storage 320 may comprise any suitable storage system for use in persistently storing data (e.g., a storage array including hard drives, flash memory, or otherwise). In addition, FIG. 3 shows persistent storage after the objects 220-250 have been stored therein. As shown in the example, each of the objects is stored with the newly created object identifier. ObjectA is shown in persistent storage 320 with an identifier of ID_0, ObjectB is shown in persistent storage with an identifier of ID_1, ObjectC with an identifier of ID_3, and objectD with an identifier of ID_2.

In addition to storing the object identifiers, data corresponding to each object is stored as well. For example, each of the stored objects is shown to include a corresponding data member data_a, data_b, data_c, and data_d. Further, ObjectA 220 in storage 320 shows the first pointer to ObjectB (0x00010010) has been replaced with the object identifier assigned to ObjectB (ID_1), and the second pointer to ObjectC (0x00008200) has been replaced in storage 320 with the new object identifier for ObjectC (ID_3). The pointer in ObjectB 250 has been replaced with an object identifier for ObjectD (ID_2), and finally the pointer in ObjectC 240 has been replaced with an object identifier for ObjectD (ID_2). As may be appreciated there may be a large number of objects in the system. FIG. 3 merely depicts four such objects for purposes of discussion.

In various embodiments, subsequent to storing the objects 220-250 to persistent storage 320, the objects in memory 250 may be removed and the map 210 may be discarded. However, in some embodiments, it is desirable to maintain the objects in memory 250 even after storing the objects to persistent storage 320. For example, it may be desired to capture a particular state of the objects in memory 250 and work with an in-memory database continued. In such an embodiment, restoration of the objects from their modified state as shown in memory 250 to their original state (e.g., as shown in memory 190 of FIG. 1 and FIG. 2) may be performed.

Figure 4:
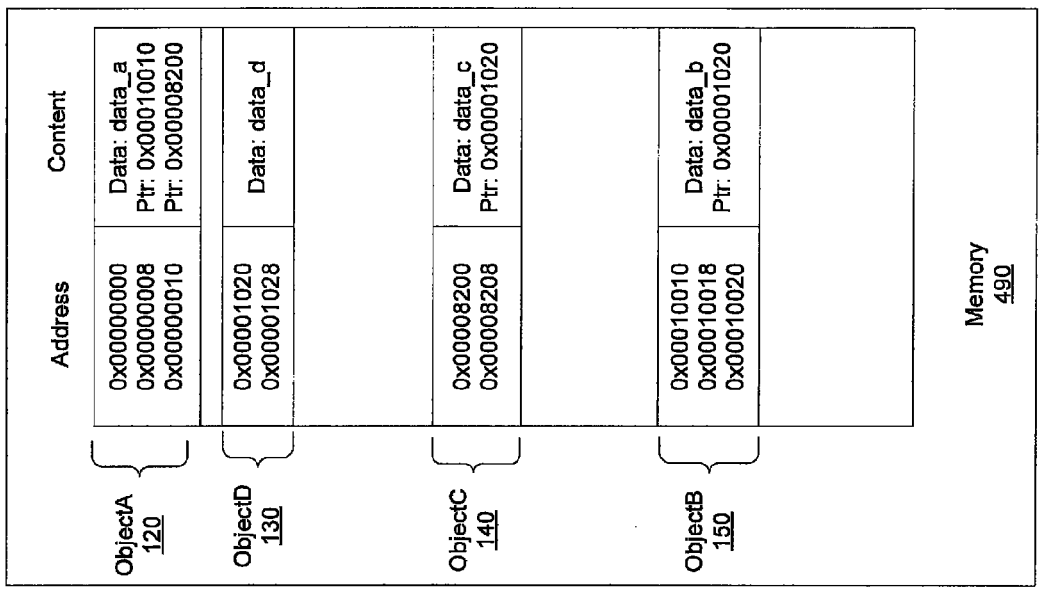
FIG. 4 illustrates one embodiment of objects in memory stored to persistent storage.
Figure 4:
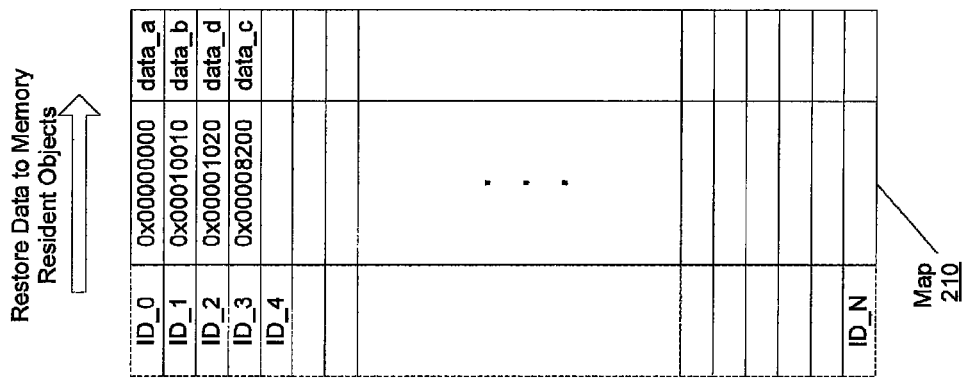
Figure 4:
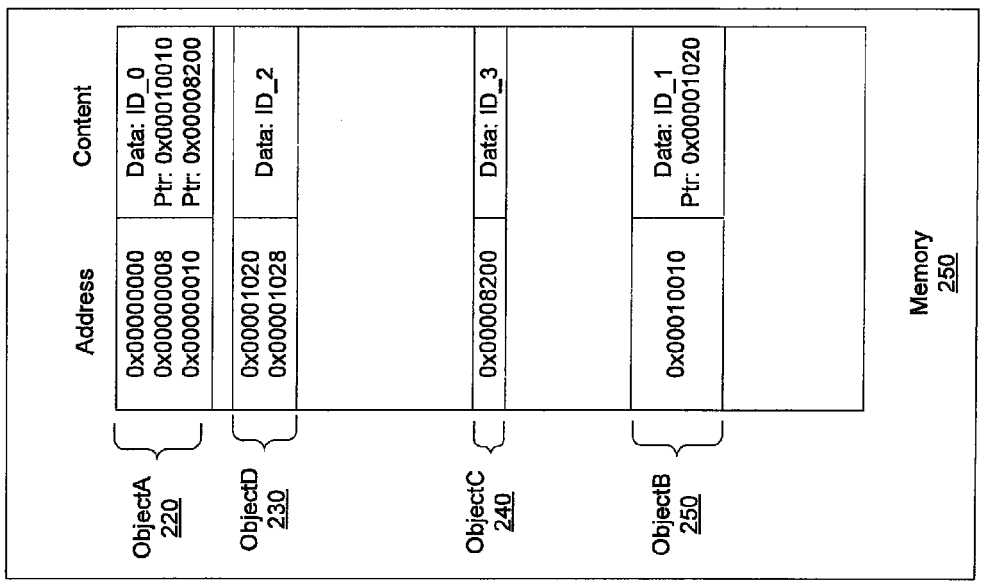

FIG. 4 illustrates one embodiment of how in-memory objects may be restored to their original state after being modified as discussed above. In the example of FIG. 4, memory 250 (as in FIG. 3) is shown after the objects have been modified by having existing data replaced with an object identifier. Therefore, memory 250 in FIG. 4 shows ObjectA 220 with Data: ID_0, ObjectD 230 with Data: ID_2, and so on. Also shown in FIG. 4 is the map 210 that was previously created as part of the process to store the objects to persistent storage. Finally, memory 490 illustrates the contents of memory after the objects 220-250 have been restored to their original state. As previously discussed, the memory location of each object is stored in map 210 along with the data that was displaced in the object. As such, in one embodiment restoration of objects to their original state includes using the stored pointer in the map 210 to directly access the corresponding object in memory. Having access to the object may also provide direct access to the data member of the object whose contents are to be changed. For example, use of a known (or otherwise identifiable) particular data member in each object may be used for storing the object identifier—such as the first data member, first non-reference data member, or any other suitable data member. In such an embodiment, restoration of the data member value may generally be performed directly. For example, if map 210 is an array of N rows, and two columns wherein the first column is the object's memory location and the second column is the displaced data value, then pseudocode to restore the data may be as follows: (map[index, 0])→Data=map[index, 1], where map[index, 0] represents the stored memory location at row index, map[index, 1] returns the data value in the table at row index, and→serves to reference the data member "Data" in the referenced object. Incrementing the index from 0 to the number stored entries may then effectively, and relatively rapidly, serve to restore all data member values. Of course, syntax for a given implementation will vary depending on the programming language used. However, operations for accessing data members of an object are well known to those skilled in the art. Numerous such embodiments are possible and are contemplated. Subsequent to restoring the objects to their original state, the map 210 may be discarded.

Figure 5:
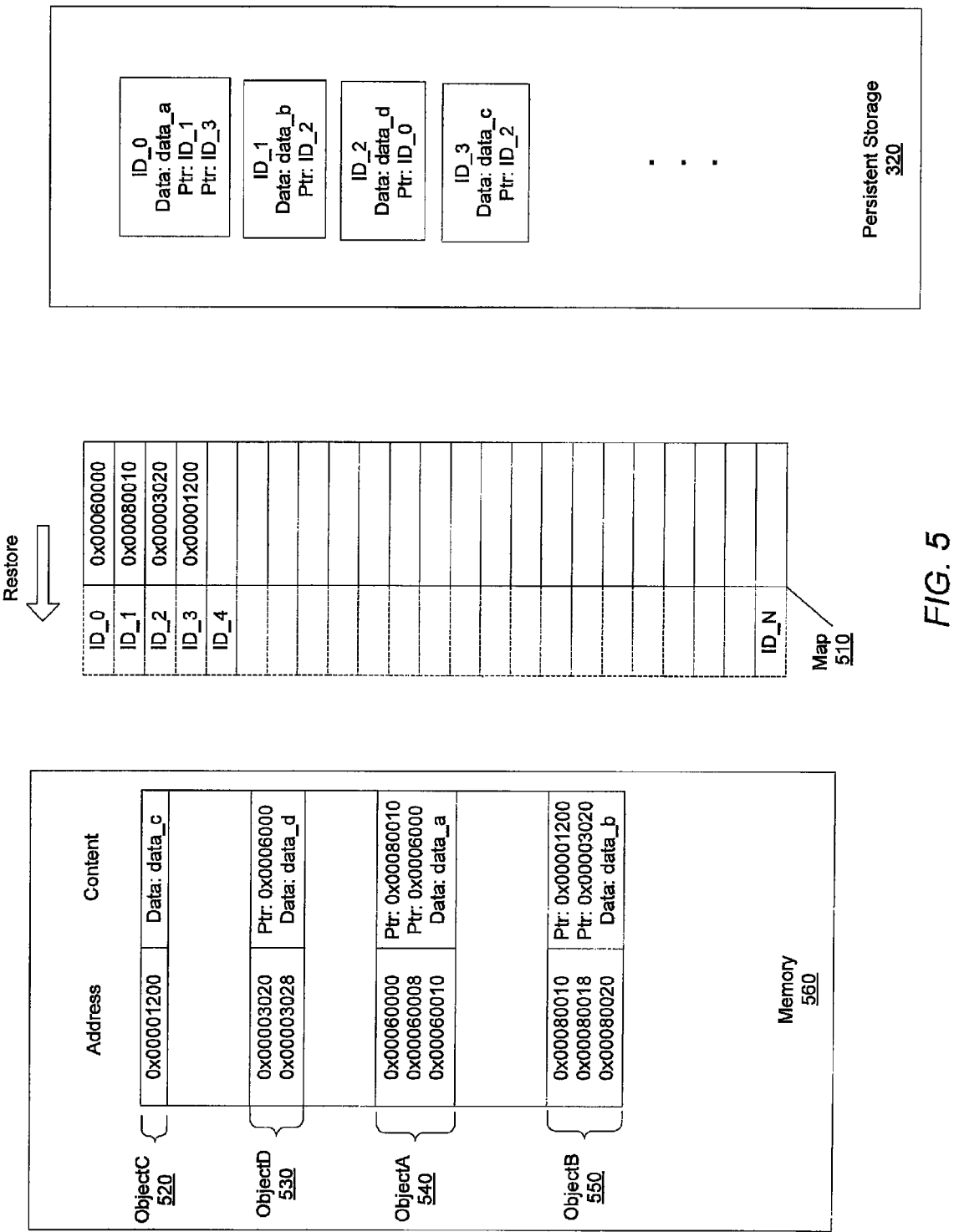
FIG. 5 illustrates one embodiment of a system for restoring objects from persistent storage to memory.

Turning now to FIG. 5, the restoration of objects from persistent storage to memory is shown. FIG. 5 shows persistent storage 320 including the previously described objects. Also shown is a memory 560 that depicts the restored objects and a map 510 (e.g., in memory) that is created and used during the restoration process. As previously discussed, when objects are restored from persistent storage 320 to memory 560, memory must be allocated for storage of the objects. This memory allocation process is generally a process in which the memory locations, and addresses to those locations, are allocated and generated dynamically. As such, the location in memory where a given object will be stored is not known in advance. As the objects in persistent storage 320 do not identify other referenced objects by memory location (i.e., relationships are indicated using object identifiers), the objects must be processed in order to restore them to memory 560.

In one embodiment, processing of objects when restoring them from persistent storage 320 includes reading an object ID from storage 320, allocating memory for storage of the object, and storing the address of the new memory location in map 510. The location in the map 510 used to store the address corresponds to the object ID. In one embodiment, objects have been stored sequentially in the storage 320 and the object identifiers are sequential as well. For example, the object with ID_0 in persistent storage 320 is read from storage and memory is allocated for the object at location 0x00060000 and the object is stored at that location. The address 0x0060000 is stored in map 510 at the location corresponding to ID_0. Data members of objects are read from storage and stored in the objects in memory 560. References to other objects in the persistent storage may be replaced by a newly allocated pointer to memory. For example, the objects ID_0, ID_1, ID_2, and ID_3, may correspond to objects ObjectA, ObjectB, ObjectD, and ObjectC, respectively. As memory is allocated for storage of each of these objects, a pointer to the object is stored in the map 510 that corresponds to the objects identifier. Accordingly, a pointer in storage 320 that merely identifies an object by object identifier may be replaced with a corresponding memory from the map 510.

This process continues until all objects desired have been restored from persistent storage 420 and the data members updated.

In one embodiment, pointers to other objects in the restored objects may be replaced with memory addresses assigned to the corresponding objects in a recursive manner which allocates storage for an object when its reference is first encountered. Such an embodiment will be described in greater detail below. Other embodiment may update the object pointers after all objects have first been restored themselves and the memory locations determined. In other embodiments, replacement of pointers to other objects may proceed prior to all objects having been restored. All such embodiments are contemplated. Once the restoration process is complete, all of the objects have been restored to memory 560 and their relationships to other objects identified.

Figure 6:
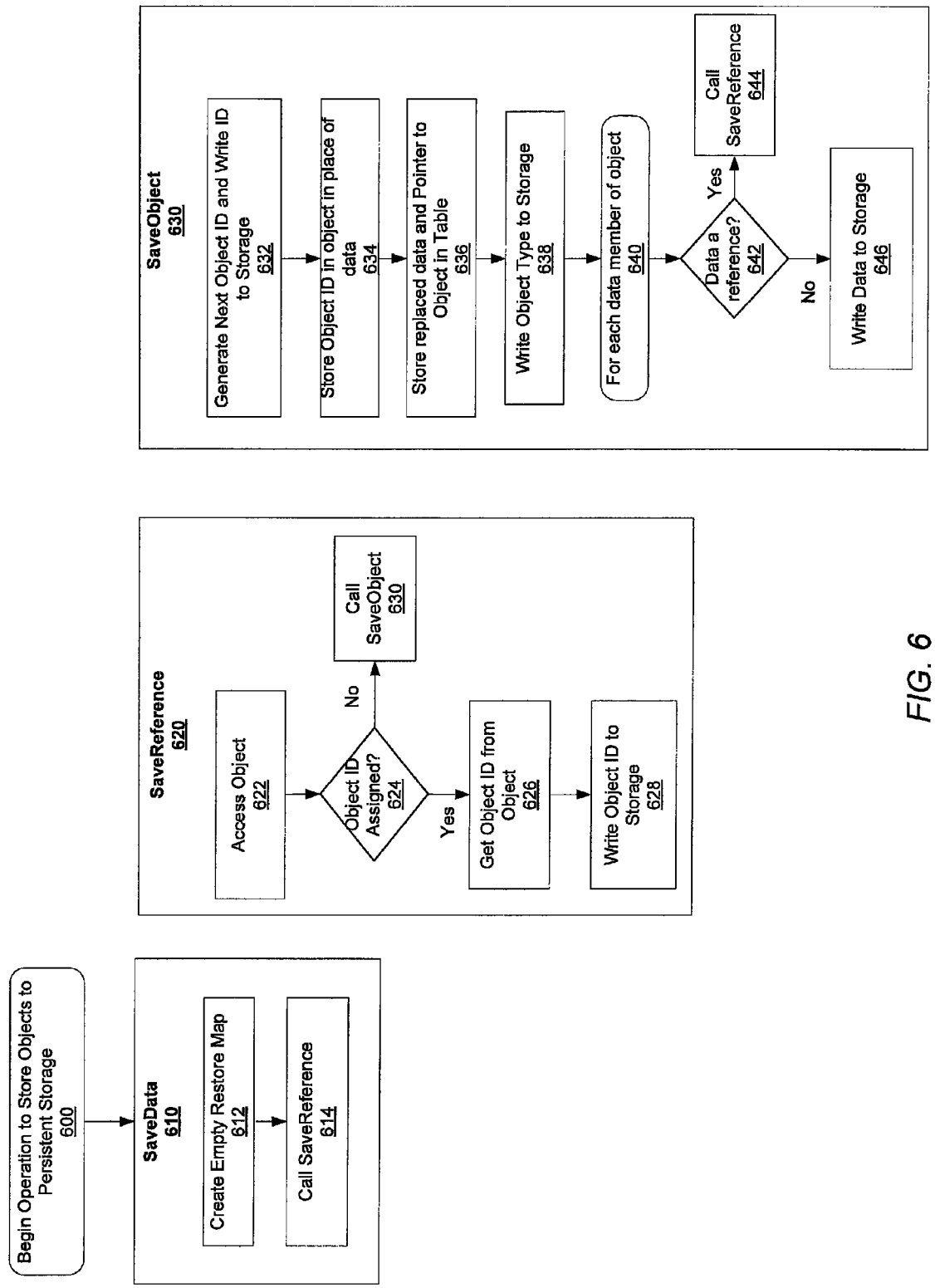
FIG. 6 is a flow diagram illustrating one embodiment of a method for storing objects to persistent storage.

Turning now to FIG. 6, one embodiment of a method for storing objects to persistent storage is shown. In the example of FIG. 6, three methods (610, 620, and 63) are generally described as operating in a recursive manner to store objects in memory to a persistent storage. As shown, an operation to store objects to persistent storage is begun (block 600) and a call the SaveData 610 method initiated. The SaveData 610 method includes creating an empty restore map (block 612). In various embodiments, this map includes a number of entries whose locations will be used to create object identifiers. For example, an array may be created that includes at least one entry for each object to be stored. The elements of the array may then correspond to object identifiers (e.g., array index/entry 0 for object identifier 0, array index/entry 1 for object identifier 1, and so on). Subsequent to creating the map, a call to the SaveReference 620 is made.

SaveReference 620 generally begins by accessing an object (block 622). In various embodiments, the first object accessed may correspond to a root object in a hierarchy of objects which are to be stored. A pointer to the root object may be included in the call to the SaveReference 620 method from block 614 of the SaveData 610 method. After accessing the object (block 622), a determination may be made as to whether an object identifier has been assigned for this object (conditional block 624). A variety of techniques are possible and are contemplated for how such a determination may be made. In one embodiment, selected bits of a data item within the object may be used to determine whether the object has been assigned an object identifier. As discussed above, data alignment requirements may require that particular data items within an object (e.g., an integer data item or pointer) must be aligned to particular addressing boundaries. For example, in one embodiment an alignment of a pointer may be on a sixteen byte addressing boundary. Consequently, in such an embodiment, the lower most four bits of a valid pointer will always be zero. Given an embodiment in which it is known that a particular valid data type will have certain bit values, a change to at least one of these bit values may be used to indicate a state change. For example, in one embodiment, when an object has been processed and had an object identifier assigned to it, at least one of the lower most bits of a pointer in the object may be set to "1". By examining this pointer value, it may be determined whether the object has been processed (e.g., bit(s) equal to zero indicates unprocessed, bit(s) equal to one indicates processed). In this manner, no additional storage is required to indicate the state of the object.

In an alternative embodiment, the type of the object itself may be used to indicate whether or not the object has been processed. For example, an object that has not been processed may correspond to a first object type or class in an object oriented paradigm. Objects which have been processed may correspond to a second different object type or class. For example, at least two classes may be defined for representing objects in the system. These classes could be a parent class and a subclass of the parent class (though not necessarily so). Objects which have not been processed may be instances of the parent class a objects which have been processed may be instances of the subclass (or vice versa). When an object changes state from unprocessed to processed, the object type may be changed. The type of object may then be determined using a run time type information or other mechanism. In some embodiments, a change in type of an object includes using a placement new type operation (e.g., similar to that provided by the C++ programming language) to change the type of an object in place—without changing its location in memory. For example, such an operation may be performed on an object with a constructor of the other type called to effectively change the object's type. These and other embodiments are possible and are contemplated.

If the object has been processed (conditional block 624), then an object identifier is obtained from the object (the object identifier having been previously stored within the object) and the object identifier is written to storage. In various embodiments, when the objects are stored they are written as a stream of data and stored in the order written (i.e., the data is effectively serialized). If an object identifier has not been assigned for this object (conditional block 630), a call to the SaveObject 630 method is made.

The SaveObject 630 method begins by generating an object identifier and writing the object identifier to storage (block 632). In one embodiment, generating the object identifier is accomplished by simply using the next unused entry of the map created in block 612. The object identifier is then stored within the object (in memory) in a location currently occupied by data. The particular data member displaced may be a particular data member that is known to be included in a given type of object. The data displaced by the object identifier is then stored in the map in the location that corresponds to the object identifier (block 636). In addition, the memory address where the object is stored is also stored in the map at that location. The object type (e.g., class type or otherwise) is then written to storage (block 638). Then for each data member of the object being stored (block 640), a determination is made as to whether or not the data member being considered is a reference (e.g., pointer) to another object in memory (conditional block 642). If not, then data member is simply written to storage (block 646). However, if the data member is a reference, then a recursive call to the SaveReference method is made (block 644). When one considers the recursive nature of the method illustrated in FIG. 6, it will be appreciated that objects are accessed and written to storage in the order in which their references are encountered. An example of how the data may be written to storage is provided in the following discussion.

Figure 7:
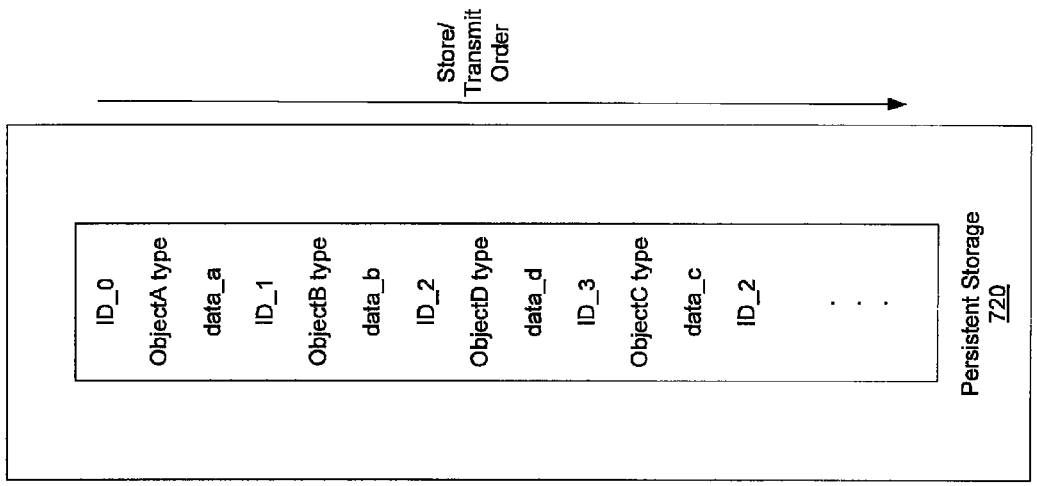
FIG. 7 illustrates one embodiment of a store operation.
Figure 7:
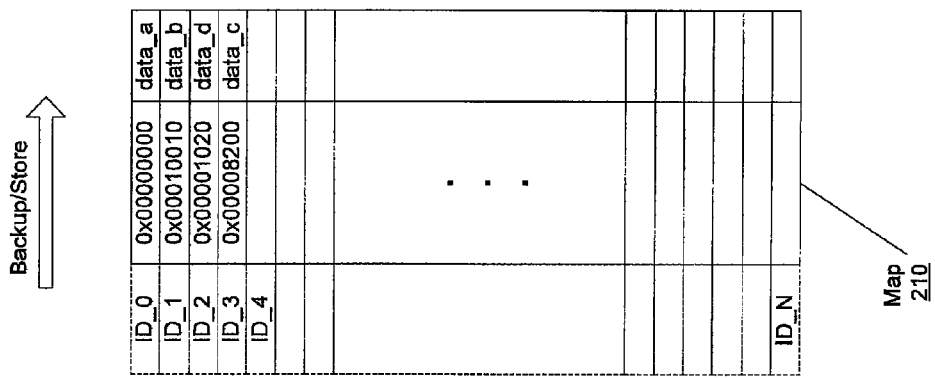
Figure 7:
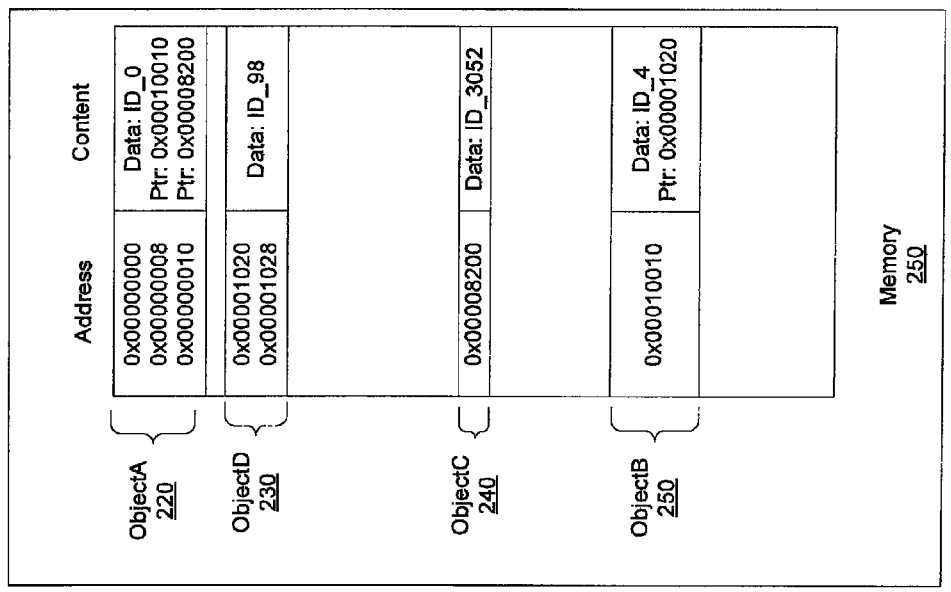

FIG. 7 illustrates how data may be stored according to the method shown in FIG. 6. In this example, the memory 250 from FIG. 3 is shown which includes the objects ObjectA-ObjectD in memory after their data members have been replaced by object identifiers and the objects written to storage 720. Also shown is map 210 from FIG. 3. Assuming objectA to be the root object, block 614 of FIG. 6 calls the SaveReference 614 method with the pointer to objectA (0x00000000). Block 622 then accesses objectA and determines if it has been assigned an object identifier (block 624). As this is the initial call, the determination is no and a call to SaveObject is made (block 630). The next unused identifier of the map (ID_0) is then written to storage (block 632) and ID_0 is written to objectA. Displaced data_a is stored in the map at location ID_0 and the address of object is stored in the map as well (block 636). Next in block 638 the object's type is written to storage (ObjectA type). Then each data member of ObjectA is processed (block 642).

The first data member processed is the data member which was replaced. In this example it will be assumed this is not a reference (though in other embodiments it could be). As we know this particular data item is the one replaced, we take the data item value from the map (data_a) and write it to storage (block 646). If this were not the data item replaced, we would simply take it from the object and write it to storage. Having processed the first data member, we move to the next and check if it is a reference (conditional block 642). In this case it is a reference (a pointer to ObjectB at 0x00010010). Therefore, a call to the SaveReference method 620 is made with the reference to ObjectB. In SaveReference 620, objectB is accessed (block 622) and a determination made as to whether it has had an object identifier assigned (conditional block 624). As it has not, a call to the SaveObject method 630 is made. Block 632 then assigns the next object identifier to ObjectB (ID_1) and write this to storage. This identifier is stored in ObjectB and its data displaced as discussed above (blocks 634, 636). Then Object B's type is written to storage (Object B type) and each of Object B's data members processed. Continuing the process results in the data written as shown in storage 720.

Figure 8:
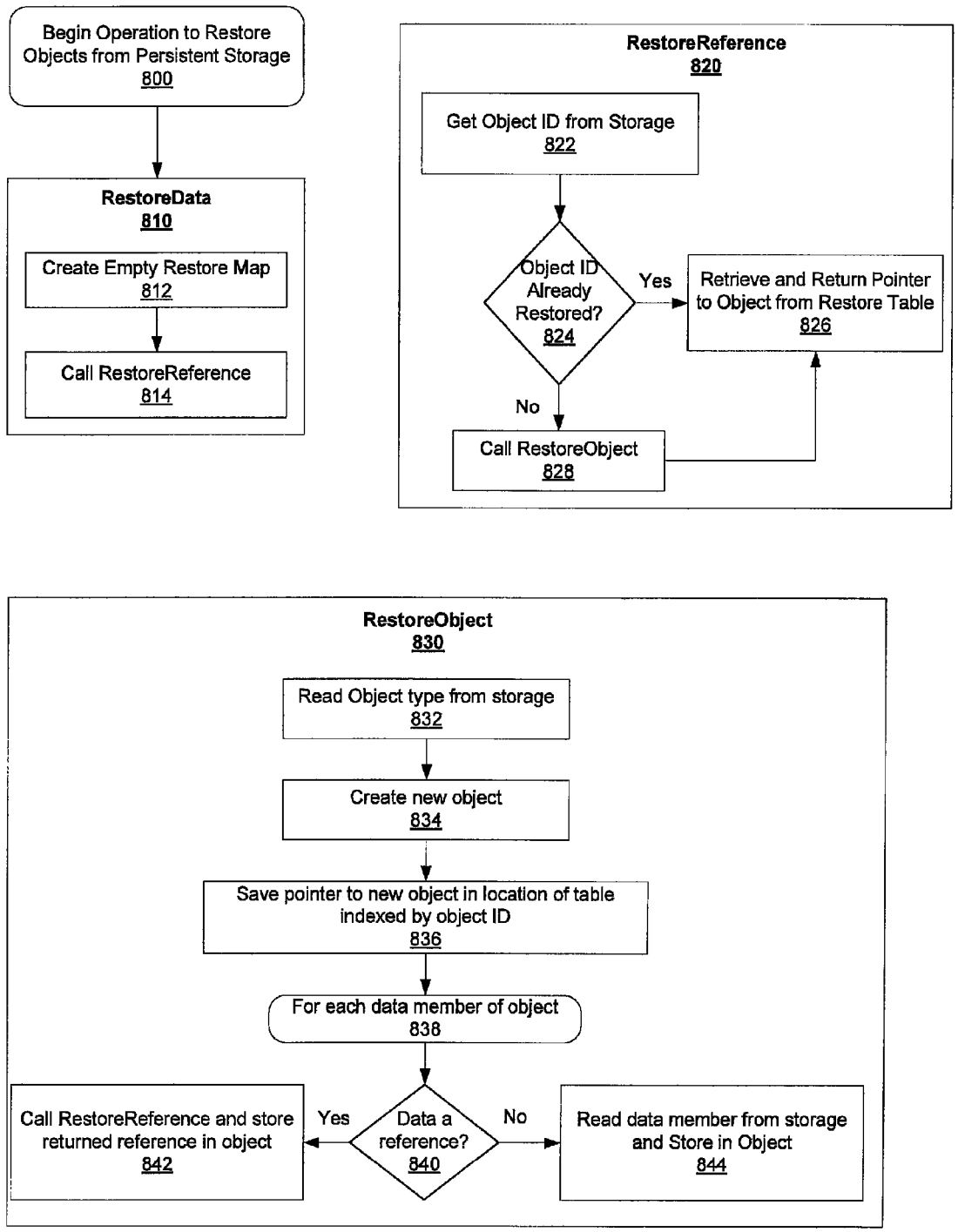
FIG. 8 is a flow diagram illustrating one embodiment of a method for restoring objects from persistent storage.

Turning now to FIG. 8, one embodiment of a method for restoring objects from persistent storage as shown. In this example, the method uses a recursive approach to restore objects which have been stored according to a method such as that of FIG. 6. For example, the method shown in FIG. 8 may be used to deserialize stored data. In such an embodiment, the data may be stored in a manner similar to that shown in persistent storage 720 of FIG. 7. In the embodiment shown, the restore operation utilizes three methods—RestoreData, RestoreReference, and RestoreObject. As may be appreciated by those skilled in the art, the embodiments described in both FIG. 8 and FIG. 6 may vary in the number of methods used and the content of those methods. The particular implementations described in these figures are not intended to be limiting, but are merely intended to be illustrative.

In the example of FIG. 8, an operation to begin the restoration is begun (block 800) and the RestoreData method 810 is called. RestoreData includes creating a restore map (block 812) for use in restoring the objects. This map may initially be empty and may be populated as processing proceeds. For example, a map similar to the map 510 of FIG. 5 may be created. Such a map may include at least one entry for storing data that corresponds to objects that are restored. The method then calls the RestoreReference method 820 (block 814).

Block 822 of RestoreReference 820 reads an object identifier from storage (block 822) and makes a determination as to whether an object corresponding to this object identifier has already been restored (conditional block 824). For example, an entry in the created map that corresponds to the object identifier may be checked to see if it includes a pointer created for a restored object. As an example, the first object identifier read from storage may be ID_0 (or simply zero, or some other initial value that was used when the objects were stored to persistent storage). The initial entry of the map (e.g., an initial entry in an array) may then be used to correspond to this first object identifier. As this object has not yet been restored to memory, there is no entry stored in the map for this object (storage of pointers in the map will be discussed shortly). In such a case, a call to the RestoreObject method 830 is made in block 828. A return from block 828 proceeds to block 826 where a pointer to an object is retrieved from the map and returned. If an object corresponding to the object identifier read from storage had already been restored (conditional block 824), then in block 826 the pointer to the object in memory may be read from the map and returned (e.g., to the object which invoked RestoreReference in this instance).

The RestoreObject method 830 reads an object type from storage (block 832). For example, assuming data such as that in storage 720, "ObjectA type" is read from the storage. As noted previously, data may be stored in a sequential manner (e.g., as a stream) and the data may be read out of storage in the same order. Having read the object type, an object of the appropriate type may then be created (block 834) in memory. The address of the memory allocated for storage of the created object may then be stored in the map (block 836). For example, in the map 510 of FIG. 5, ObjectA is stored at the memory location 0x0006000 and this address is stored in the first entry of the map. As the object type is now known (as read from storage), the various data member types may also be determined. Block 838 proceeds by processing each data member of the object. If the data member is not a reference (conditional block 840), then the data member value is read from storage and stored within the object (block 844). In this example, the first data member of ObjectA (data_a) is not a reference. Therefore, a read from storage is performed and the value (data_a) is stored in the object.

Block 838 then proceeds again by processing the next data member of the object. In this case the next data member is a reference (e.g., a reference to ObjectB), and a call to the RestoreReference method is made (block 842). A reference returned after the call to RestoreReference in block 842 is stored in the object. RestoreReference then reads an object identifier from storage (block 822) and determines if this object identifier has been restored (conditional block 824). In our example, ID_1 is read from storage and it is determined this has not yet been restored. Accordingly, a call to RestoreObject is again performed (block 828). In this manner the process proceeds in a recursive manner. At some point, the recursion will return to the point where the second data member of ObjectC will be processed at block 838. In such a case, the pointer from ObjectC to ObjectD will be encountered. As this is a reference, an object identifier will be read from storage (block 822). However, in this case the object identifier ID_2 is determined to already be restored. Therefore, rather than making a call to RestoreObject in block 828, the pointer in the map that corresponds to ID_2 (e.g., 0x00001020) is retrieved from the map and returned. After all objects have been restored to memory and their values updated, the map may be discarded. It is noted that while FIG. 8 and other figures depict method steps as occurring in a particular order, in other embodiments the ordering of steps may be different, additional steps may be included, some steps may be absent, various steps may be performed concurrently, and so on.

Figure 9:
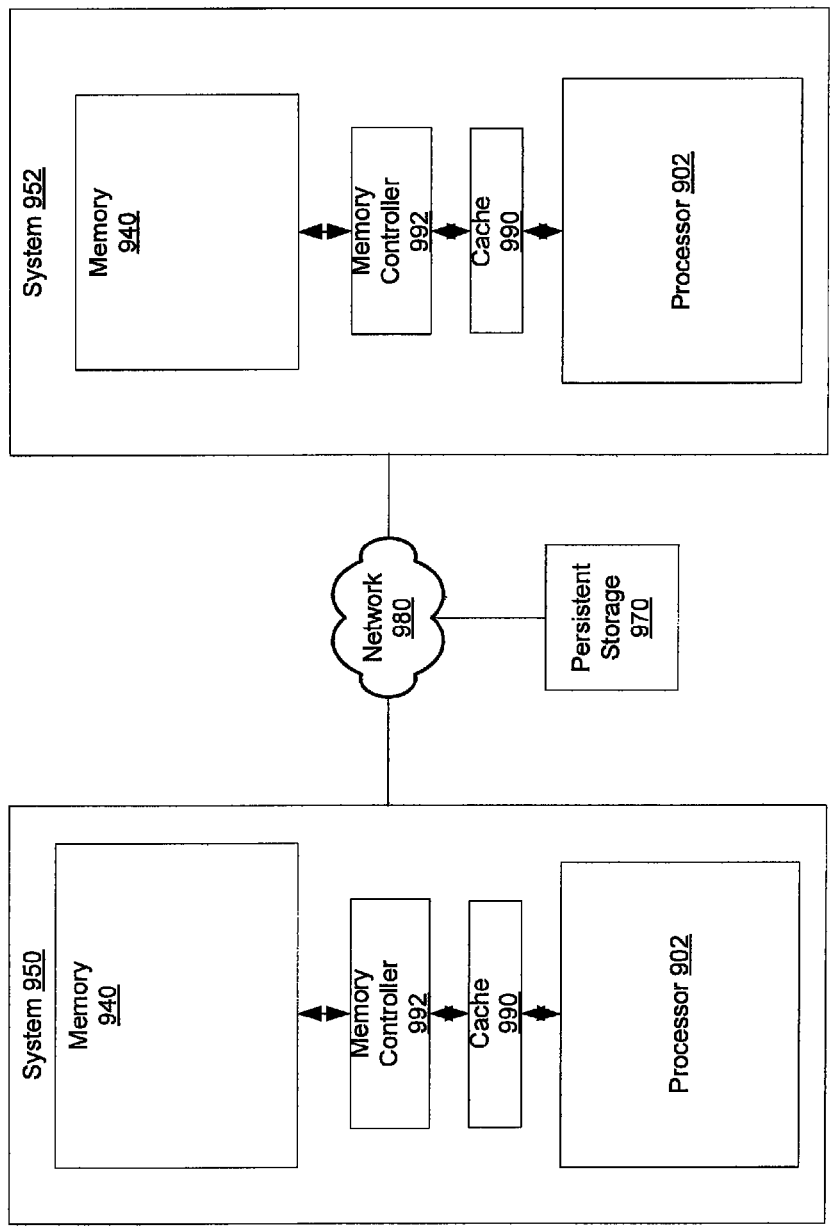
FIG. 9 illustrates one embodiment of a computing system.

Referring to FIG. 9, a general overview of one embodiment of a computing system(s) in which the above described methods and mechanism may be used is shown. As may be appreciated by those skilled in the art, the example shown in FIG. 9 is merely one of many possible embodiments. In the example of FIG. 9, two systems 950 and 952 are shown, each of which are coupled via a network 980 to persistent storage 970. Persistent storage 970 may, for example, correspond to storage such as a storage array for use in a database system, or otherwise. Systems 950 and 952 may or may not include a same architecture.

Platform 950 may have one or more processors 902, although only one is shown. Each processor 902 may, for example, include a superscalar microarchitecture with one or more multi-stage pipelines. Alternatively, each processor may correspond to a virtual machine operable to interpret or otherwise execute program instructions. Each processor 902 may be configured to execute instructions of software applications corresponding to an instruction set architecture (ISA) such as x86, SPARC®, PowerPC®, MIPS®, ARM®, or otherwise. Also, each processor 902 may be designed to execute multiple strands, or threads. For example, a multi-thread software application may have each of its software threads scheduled to be executed on a separate pipeline within a processor 902, or alternatively, a pipeline may process multiple threads via control at certain function units.

Each processor 902 may comprise a first-level cache or in other embodiments, the first-level cache may be outside the processor 902. Each processor 902 and first-level cache may be coupled to shared resources such as a second-level caches and lower-level memory 940 via memory controllers 992. Interfaces between the different levels of caches may comprise any suitable technology. In other embodiments, other levels of caches may be present between a first-level cache and memory controller 992. In one embodiment, an I/O interface may be implemented in memory controller 992 to provide an interface for I/O devices to cache 990, other caches located both internally and externally to processor 902, and to processor 902. Memory controllers 992 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives.

Various embodiments of the methods and mechanisms described herein may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computing system, the method comprising:
 initiating an operation to store a plurality of objects from a memory to persistent storage;
 wherein said operation comprises:
  accessing an object of the plurality of objects;
  in response to determining an object identifier used to uniquely identify the object from each other object of the plurality of objects has already been assigned to the object and is stored within the object, storing the object to persistent storage;
  in response to determining an object identifier has not been assigned to the object:
   assigning a new object identifier to the object used to uniquely identify the object from each other object of the plurality of objects;
   storing the new object identifier in the object; and
   storing the object in persistent storage;
 maintaining a temporary data structure including a plurality of entries, wherein each of the plurality of entries associates a new object identifier with a pointer to a memory location where a corresponding object resides and a data member of the corresponding object;
 wherein storing the new object identifier for the object within the object comprises:
  replacing existing data in the object with the new object identifier;
  storing the new object identifier in a given entry of the temporary data structure;
  storing the existing data replaced by the new object identifier in the given entry; and
  storing a pointer to the memory location where the object resides in the given entry.

2. The method as recited in claim 1, wherein processing each data member of the object comprises:
 writing non-reference data members to the persistent storage; and
 replacing references within the object to other objects with object identifiers created for the other objects.

3. The method as recited in claim 2, further comprising writing a type of said object to the persistent storage.

4. The method as recited in claim 3, further comprising an operation to restore objects from the persistent storage, wherein said restore operation comprises:
 creating a new temporary data structure;
 retrieving an object identifier from the persistent storage;
 if the object identifier has already been assigned to a restored object, retrieving a pointer to the object from the new temporary data structure;
 if the object identifier has not already been assigned to a restored object:
  reading an object type from the persistent storage;
  creating a new object that corresponds to the object type;
  saving a pointer to the new object in a location of the new temporary data structure that corresponds to the object identifier; and
  processing each data member of the new object.

5. The method as recited in claim 4, wherein processing each data member of the new object comprises:
 reading non-reference data members from the persistent storage and storing the non-reference data members in the new object; and
 replacing references within the new object to other objects with pointers created for the other objects restored from the persistent storage.

6. The method as recited in claim 2, wherein replacing said references comprises recursive method calls which access a referenced object, and write the referenced object identifier to persistent storage if the referenced object identifier has already been assigned to the referenced object.

7. The method as recited in claim 6, wherein if the referenced object does not have an assigned object identifier, the recursive method call comprises:
 assigning a given object identifier to the referenced object;
 writing the given object identifier to the persistent storage;
 storing the given object identifier in the referenced object; and
 processing each data member of the referenced object.

8. The method as recited in claim 2, wherein subsequent to storing the plurality of objects to the persistent storage, the method further comprises restoring the existing data to the plurality of objects residing in the memory.

9. The method as recited in claim 8, wherein restoring the existing data comprises:
 traversing entries of the temporary data structure;
 utilizing a pointer stored in a given entry to access an object in memory; and replacing an object identifier stored in the object in memory with data in the given entry.

10. The method as recited in claim 1, wherein said data structure is an array, and wherein the data and pointer are stored in a location of the array which corresponds to the object.

11. A computing system, wherein said system comprises:
a memory configured to store a plurality of objects;
a persistent storage medium configured to store data; and
a processor, wherein the processor is configured to:
   initiate an operation to store a plurality of objects from a memory to persistent storage;
   wherein to perform said operation the processor is configured to:
      access an object of the plurality of objects;
      in response to determining an object identifier used to uniquely identify the object from each other object of the plurality of objects has already been assigned to the object and is stored within the object, store the object to persistent storage;
      in response to determining an object identifier has not been assigned to the object:
         assign a new object identifier to the object used to uniquely identify the object from each other object of the plurality of objects;
         store the new object identifier in the object; and
         store the object in persistent storage;
         process each data member of the object:,
      maintain a temporary data structure including a plurality of entries, wherein each of the plurality of entries associates a new object identifier with a pointer to a memory location where a corresponding object resides and a data member of the corresponding object;
   wherein to store the new object identifier for the object within the object, the processor is configured to:
      replace existing data in the object with the new object identifier;
      store the new object identifier in a given entry of the temporary data structure;
      store the existing data replaced by the new object identifier in the given entry; and
      store a pointer to the memory location where the object resides in the given entry.

12. The computing system as recited in claim 11, wherein to process each data member of the object, the processor is configured to:
write non-reference data members to the persistent storage; and
replace references within the object to other objects with object identifiers created for the other objects.

13. The computing system as recited in claim 12, wherein the processor is further configured to write a type of said object to the persistent storage.

14. The computing system as recited in claim 13, wherein the processor is further configured to restore objects from the persistent storage, wherein the processor is configured to:
create a new temporary data structure;
retrieve an object identifier from the persistent storage;
if the object identifier has already been assigned to a restored object, retrieve a pointer to the object from the new temporary data structure;
if the object identifier has not already been assigned to a restored object:
   read an object type from the persistent storage;
   create a new object that corresponds to the object type;
   save a pointer to the new object in a location of the new temporary data structure that corresponds to the object identifier; and
   process each data member of the new object.

15. The computing system as recited in claim 12, wherein to replace said references the processor is configured to recursively call a method which accesses a referenced object, and writes the referenced object identifier to persistent storage if the referenced object identifier has already been assigned to the referenced object.

16. The computing system as recited in claim 15, wherein if the referenced object does not have an assigned object identifier, the method is configured to:
assign a given object identifier to the referenced object;
write the given object identifier to the persistent storage;
store the given object identifier in the referenced object; and
process each data member of the referenced object.

17. The computing system as recited in claim 11, wherein said data structure is an array, and wherein the data and pointer are stored in a location of the array which corresponds to the object.

18. A non-transient computer readable storage medium storing program instructions, wherein the program instructions are executable to:
initiate an operation to store a plurality of objects from a memory to persistent storage;
wherein to perform said operation, the program instructions are executable to:
   access an object of the plurality of objects;
   in response to determining an object identifier used to uniquely identify the object from each other object of the plurality of objects has already been assigned to the object and is stored within the object, store the object to persistent storage;
   in response to determining an object identifier has not been assigned to the object:
      assign a new object identifier to the object used to uniquely identify the object from each other object of the plurality of objects;
      store the new object identifier in the object; and
      store the object in persistent storage;
      process each data member of the object;
   maintain a temporary data structure including a plurality of entries, wherein each of the plurality of entries associates a new object identifier with a pointer to a memory location where a corresponding object resides and a data member of the corresponding object;
   wherein to store the new object identifier for the object within the object, the instructions are executable to:
      replace existing data in the object with the new object identifier;
      store the new object identifier in a given entry of the temporary data structure;
      store the existing data replaced by the new object identifier in the given entry; and
      store a pointer to the memory location where the object resides in the given entry.

19. The storage medium as recited in claim 18, wherein the program instructions are executable to restore objects from a persistent storage to a memory, wherein the program instructions are executable to:
create a new temporary data structure;
retrieve an object identifier from the persistent storage;

if the object identifier has already been assigned to a restored object, retrieve a pointer to the object from the new temporary data structure;
if the object identifier has not already been assigned to a restored object:
read an object type from the persistent storage;
create a new object that corresponds to the object type;
save a pointer to the new object in a location of the new temporary data structure that corresponds to the object identifier; and
process each data member of the new object.

* * * * *